United States Patent [19]
Koljonen

[11] Patent Number: 5,934,651
[45] Date of Patent: Aug. 10, 1999

[54] WILDLIFE BARRIER

[76] Inventor: Reino Koljonen, 110-A3 Half Moon Cir., Lantana, Fla. 33462

[21] Appl. No.: 09/190,632

[22] Filed: Nov. 12, 1998

[51] Int. Cl.[6] .................................................. A01G 17/06
[52] U.S. Cl. ................................. 256/23; 256/1; 256/32
[58] Field of Search ............................... 256/23, 24, 29, 256/32, 47, 34, 1

[56] References Cited

U.S. PATENT DOCUMENTS

| | | | |
|---|---|---|---|
| 283,606 | 8/1883 | Hollister | 256/34 |
| 328,392 | 10/1885 | Dudley | 256/24 |
| D. 404,150 | 1/1999 | Jacobsmeyer | D25/126 |
| 461,762 | 10/1891 | Loether | 256/32 |
| 3,892,387 | 7/1975 | Mann | 256/24 |
| 4,881,721 | 11/1989 | Manley | 256/52 |
| 4,944,493 | 7/1990 | Handy | 256/23 |
| 5,131,630 | 7/1992 | Nash | 256/23 |
| 5,657,967 | 8/1997 | Patrick | 256/19 |

FOREIGN PATENT DOCUMENTS 1136036  9/1966  United Kingdom ....................... 256/1

*Primary Examiner*—Lynne Reichard
*Assistant Examiner*—David E. Bochna
*Attorney, Agent, or Firm*—Robert M. Downey, P.A.

[57] ABSTRACT

A wildlife barrier is provided for preventing certain species of wildlife, such as alligators and turtles, from crossing a boundary between two areas, thereby preventing potentially harmful encounters with humans and other animal species. The wildlife barrier includes one or more sections extending along the boundary, each section including a pair of stakes structured and disposed to be driven into the ground so that an upper portion of the stakes extends vertically above the ground surface. Panels are vertically supported between the stakes on a wire cord pulled taut and secured to the stakes. Spacer elements fitted to the cord maintain the panels at equally spaced intervals, in parallel relation to one another, with the panels hanging from the cord so that a bottom edge of the panels is maintained close to the ground surface.

4 Claims, 2 Drawing Sheets

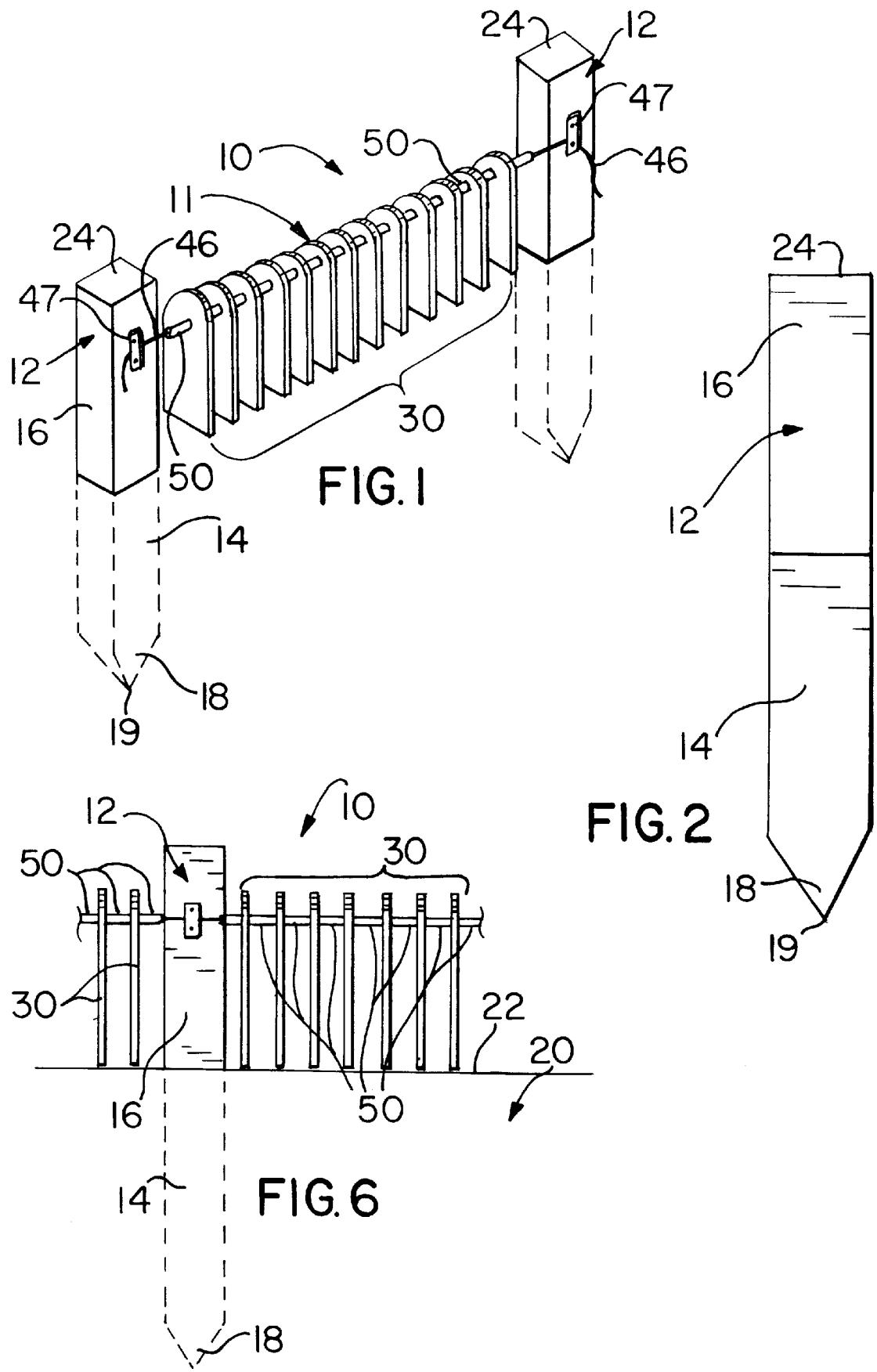

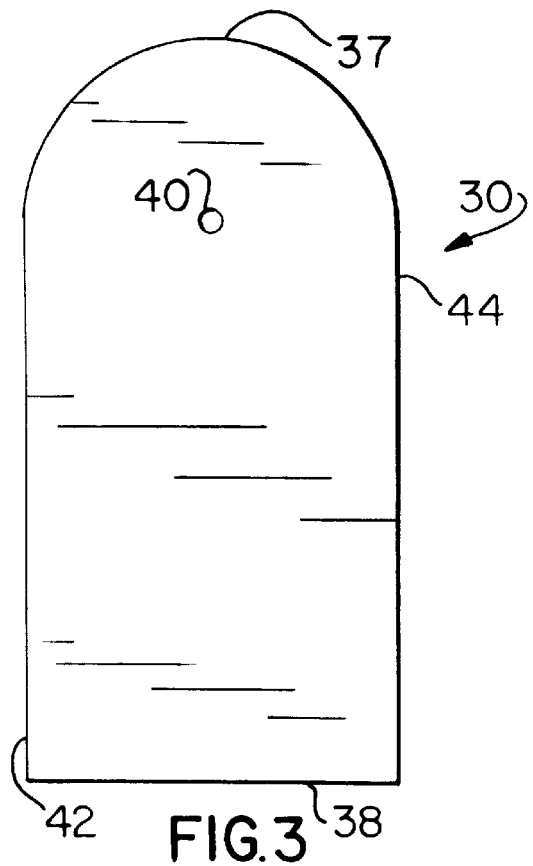
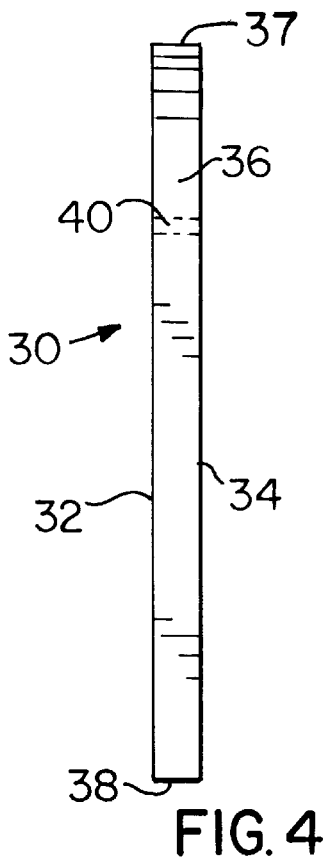
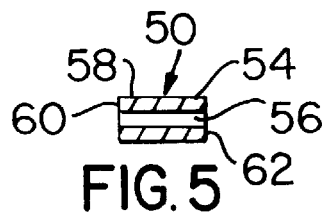
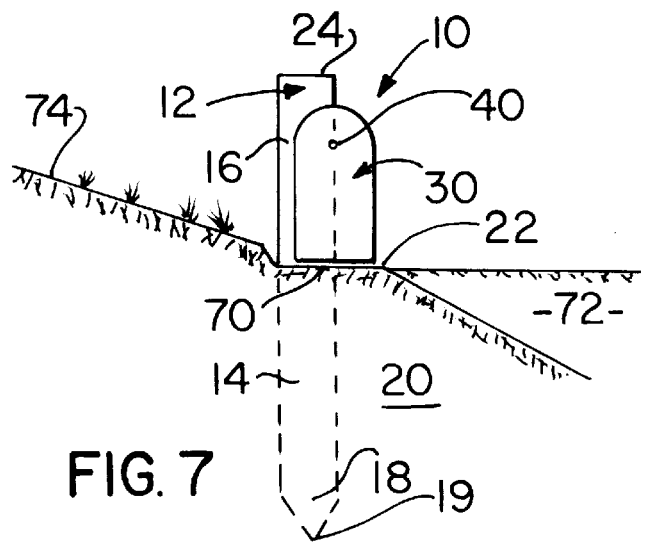

WILDLIFE BARRIER

BACKGROUND OF THE INVENTION

1. Field of the Invention

The present invention relates to a wildlife barrier for preventing certain species of wildlife from crossing over a boundary between two areas, and more particularly to a fence structure having a plurality of panels suspended in spaced, parallel relation on a cord secured between a pair of stakes driven into the ground.

2. Description of the Related Art

In order to protect wildlife and the human population, it is sometimes necessary to restrict migration or movement of certain species of wildlife. For instance, in the southeastern United States, it is not uncommon for alligators to venture into human populated areas including major roads, lakes, golf courses, back yards, and swimming pools. This presents an extremely dangerous threat to the human population, domestic pets, other animal species, as well as the alligator. There have been numerous cases in the past wherein small children, dogs and cats have been attacked and killed by alligators in the back yards of homes in suburban neighborhoods. This is particularly a problem with homes that are situated on fresh water lakes or canals where alligators sometimes emerge unexpectedly. Efforts in the past to preserve the alligator have now resulted in a rapidly increasing alligator population in wildlife areas. As the number of alligators steadily increases, there is a natural migration which expands out from the wildlife areas and into domestic areas.

One particular problem arises when various species of wildlife enter onto major roadways. For instance, alligators and turtles sometimes enter roadways, including major interstate highways and turnpikes, when migrating from one area to another. In an attempt to avoid running over these animals, drivers often make erratic evasive maneuvers while travelling at high speed, sometimes resulting in deadly automobile accidents. On other occasions, turtles, alligators, and other animal species are struck and killed by automobiles.

The most effective way to prevent dangerous encounters involving the particular wildlife species is to construct barriers along designated boundaries between two areas so that the particular species of wildlife in one area cannot intermingle with humans and other animal species in the other area. However, barriers which are commonly used, such as a chainlink fence, are considerably costly, especially when there is a need to install the barrier over a great distance. Further, chainlink fences and other barrier structures can be unsightly and, therefore, they are not highly desirable for use in domestic areas such as along the perimeter of a lake, golf course, or roadway. Furthermore, chainlink fences and other known barrier structures typically require regular maintenance as a result of exposure to the outdoor elements.

Accordingly, there exists a need for a wildlife barrier which is structured to prevent migration of select animal species beyond a boundary between two areas wherein the barrier is relatively inexpensive and aesthetically appealing.

SUMMARY OF THE INVENTION

It is a primary object of the present invention to provide a wildlife barrier which can be easily installed along a boundary between two areas in order to prevent certain species of wildlife from crossing over the boundary.

It is a further object of the present invention to provide a wildlife barrier which provides a low profile, aesthetically pleasing appearance.

It is still a further object of the present invention to provide a wildlife barrier which is relatively inexpensive to manufacture and install.

It is still a further object of the present invention to provide a wildlife barrier which is structured to resist corrosion and deterioration over an extended period of time when exposed to the outdoor elements, including water, temperature extremes, and insects.

It is still a further object of the present invention to provide a wildlife barrier which is constructed at least partially from recycled materials.

It is yet a further object of the present invention to provide a wildlife barrier which provides a camouflage appearance so that the barrier blends in with the natural surroundings.

It is a further object of the present invention to provide a wildlife barrier which is particularly suited to prevent alligators from crossing over a boundary between two areas.

It is still a further object of the present invention to provide a wildlife barrier for preventing movement of turtles and other like crawling reptiles across a boundary between two areas.

In general, the objects and advantages of the present invention are accomplished by a wildlife barrier having at least one section structured and disposed to extend along a boundary between two areas. The barrier section includes a pair of elongate stakes being structured to be driven into the ground so that an upper portion of the stakes extends vertically above the ground surface. A plurality of panels are supported in spaced, parallel relation between the stakes on a wire cord. The wire cord is secured to the stakes and pulled tight to eliminate slack in the cord. Each of the panels is provided with an aperture formed through an upper portion of the panels, the aperture in each of the panels being sized for passage of the wire cord therethrough, so that the panels are suspended on the cord. The cord is strung between the stakes at a height so as to maintain a bottom edge of the panels in close relation to the ground surface, and preferably no more than one inch above the ground surface. Sleeve segments fitted to the cord serve as spacers between the panels to maintain the panels in equal spaced, parallel relation.

Further objects and advantages of the present invention will be more readily apparent with reference to the following detailed description and accompanying drawings, setting forth a preferred embodiment of the present invention.

BRIEF DESCRIPTION OF THE DRAWINGS

For a fuller understanding of the nature of the present invention, reference should be made to the following detailed description taken in conjunction with the accompanying drawings in which:

FIG. 1 is a perspective view of a section of the wildlife barrier in accordance with a preferred embodiment;

FIG. 2 is an elevational view of a stake used in the assembly of the wildlife barrier;

FIG. 3 is a front elevation of a panel of the wildlife barrier;

FIG. 4 is a side elevation of the panel of FIG. 3;

FIG. 5 is a sectional view of a spacer element used in the assembly of the preferred embodiment;

FIG. 6 is a front elevation of a portion of the section of the wildlife barrier; and FIG. 7 is an end elevation of the wildlife barrier shown installed at a boundary along the perimeter of a lake, between the lake and dry land.

Like reference numerals refer to like parts throughout the several views of the drawings.

DETAILED DESCRIPTION OF THE PREFERRED EMBODIMENT

Referring to the several views of the drawings, the wildlife barrier assembly of the present invention is shown and generally indicated as 10. The wildlife barrier includes at least one section 11 which is structured and disposed to extend along a boundary between two areas, such as between a lake and dry land, as seen in FIG. 7. Each section of the wildlife barrier assembly 10 includes a pair of elongate stakes 12 having a lower portion 14 and an upper portion 16. The lower portion 14 includes a lower distal end 18 which is tapered to a point 19 to facilitate driving the stake downwardly into the ground 20, below the ground surface 22, by pounding on the top end 24. When driven into the ground so that the lower portion 14 is below the ground surface and the upper portion 16 vertically extends above the ground surface, the stake is anchored to thereby resist lateral movement. In a preferred embodiment, the stake is formed of a pressure treated wood to protect against rot and deterioration from exposure to the elements, including soil, water, temperature extremes, or destroying organisms and insects.

The wildlife barrier assembly further includes a plurality of panels 30, as best seen in FIGS. 3 and 4, each including opposite faces 32, 34, a upper zone 36, a top end 37, and a bottom edge 38. An aperture 40 is formed through the thickness of each of the panels, between the opposite faces 32, 34, in the upper zone. Preferably, the apertures is centered between opposite sides 42, 44 of the panels 30. In a preferred embodiment, the panels are formed of a recycled material which has been compressed and treated to produce a material which will not deteriorate, delaminate, or otherwise break apart when exposed to or submerged in water. Alternatively, the panels may be formed of plastic, pressure treated wood or other weather-resistant material. In this manner, the barrier assembly can be installed along the perimeter of a lake or other body of water, wherein rising levels of the body of water may cause the panels to be partially or fully submerged for extended periods of time.

With two stakes 12 anchored into the ground, at a spaced distance, to define a length of the barrier section, a cord 46 is secured to the two stakes and pulled taut to eliminate any slack in the cord. To secure the cord 46 to the stakes, conventional fastening means 47 may be used, including galvanized or stainless steel nails, U-bolts, eye bolts, and the like. In a preferred embodiment, the cord is formed of a wire strand cable which may be galvanized or stainless steel to resist corrosion. It is further preferable that the wire strand cable be encapsulated within a liquid impervious outer coating, such as a plastic sleeve, to further protect the cable from rust and corrosion. The wire cord or cable is specifically sized to extend through the apertures in each of the panels, to thereby support the panels in a suspended, vertical orientation, as seen in FIGS. 1, 6 and 7.

The barrier assembly 10 further includes a plurality of spacer elements 50 for maintaining the panels in equi spaced intervals along the length of the barrier section, so that the panels are maintained in the vertical, upright position in parallel relation to one another, as best seen in FIG. 6. In a preferred embodiment, the spacer elements 50 comprise a tubular sleeve segment 54 as shown in FIGS. 5 and 6. The sleeve segment 54 includes an axial bore 56 extending therethrough being sized and configured for sliding passage of the cord therethrough. The cylindrical wall 58 of the sleeve is of a diameter which is greater than the diameter of the apertures formed in the panels, thereby causing the opposite ends 60, 62 of the sleeve to butt up against the faces 32, 34 of adjacently positioned panels, in surrounding relation to the apertures. As seen in FIG. 6, the sleeve segments 54 are fitted between each of the adjacently positioned panels, wherein the length of the sleeve segment defines an amount of space between each panel. In a preferred embodiment, the length of the sleeve segment is between one and six inches.

In the preferred embodiment, wildlife barrier 10 of the present invention is used to control migration of alligators, turtles, and other like crawling creatures from crossing a boundary between two areas. For instance, as seen in FIG. 7, the wildlife barrier 10 may be installed along the perimeter 70 of a body of water 72, such as a lake, and dry land 74. The wildlife barrier assembly 10 is specifically structured to deter an alligator, turtle or other like crawling creature from crossing the boundary. An example in FIG. 7, the wildlife barrier 10 will deter an alligator or turtle from exiting the lake and entering the dry land area. In this particular embodiment, the panels have a height between the bottom edge 38 and the uppermost top edge 37 measuring approximately 15–20 inches. The cord 46 strung between adjacently positioned stakes is maintained at a height of approximately 12 inches above the ground surface. It is preferable to maintain the bottom edge of the panels slightly above the ground surface (preferably no more than 2 inches), leaving space between the bottom edge and the ground surface so that the bottom edge can be exposed to air for purposes of drying when not submerged in water.

In order to blend with the natural surroundings, to thereby camouflage the appearance of the barrier assembly 10, the panels 30, stakes 12 and spacer elements 50 may be colored by painting, dyeing or other means. For instance, in a grassy area, it is best to color the assembly green so that it is not highly noticeable to humans, thereby maintaining an aesthetically pleasing appearance in a yard, on a golf course, or on the side of a road.

While the instant invention has been shown and described in what is considered to be a preferred and practical embodiment thereof, it is recognized that departures may be made within the spirit and scope of the present invention which, therefore, should not be limited except as set forth in the following claims as interpreted under the doctrine of equivalents.

What is claimed is:

1. A wildlife barrier assembly for installation into the ground along a boundary between two areas, said barrier assembly comprising:

at least one section structured and disposed to extend along said boundary and comprising:

a pair of elongate stakes each having an upper portion and a lower portion and a distal end on said lower portion, said distal end being structured and disposed for driving into the ground in order to anchor said stake therein with said lower portion extending below the ground surface and said upper portion extending vertically above the ground surface, said pair of stakes being structured and disposed to be anchored in spaced, distanced relation to one another to thereby define a length of said section;

a plurality of panels each including an upper zone, a bottom edge, and an aperture formed through a thickness of said panel in said upper zone;

cord means structured and disposed to extend through said aperture of each of said panels, and being further structured to be secured to said pair of stakes with said cord means being held taut therebetween for supporting said plurality of panels in a vertical orientation above the ground surface with said plurality of panels hanging from said cord means so that said plurality of panels are able to swing independently of one another and said bottom edge of each of said plurality of panels is movable relative to the ground surface; and spacer means for maintaining said plurality of panels at equally spaced intervals, in parallel relation to one another, along said length of said section between said pair of stakes and including a plurality of tubular sleeve segments having an axial bore formed therethrough sized and configured for passage of said cord means, said tubular sleeve segments further including an outer diameter being greater than a diameter of said aperture formed through each of said panels.

2. The wildlife barrier assembly as recited in claim 1 wherein said elongate stakes are formed of pressure treated wood.

3. The wildlife barrier assembly as recited in claim 1 wherein said plurality of panels are formed of recycled materials.

4. The wildlife barrier assembly as recited in claim 1 wherein said cord means includes a wire strand cable encapsulated within a liquid impervious outer coating.

* * * * *